No. 611,699.  
H. S. MILLER.  
BICYCLE WHEEL GUARD CLEANER.  
(Application filed Nov. 16, 1897.)  
Patented Oct. 4, 1898.
(No Model.)
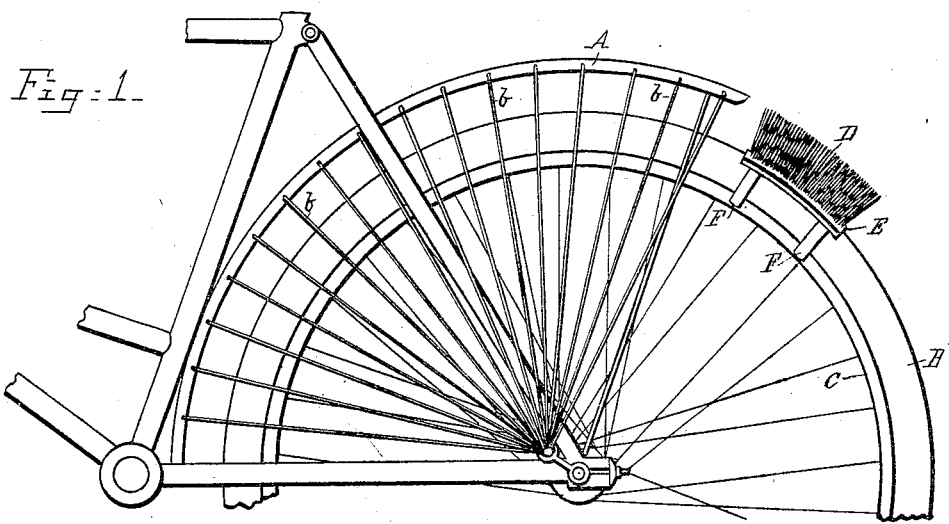
Fig. 1.
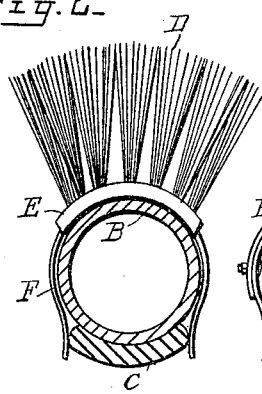
Fig. 2.
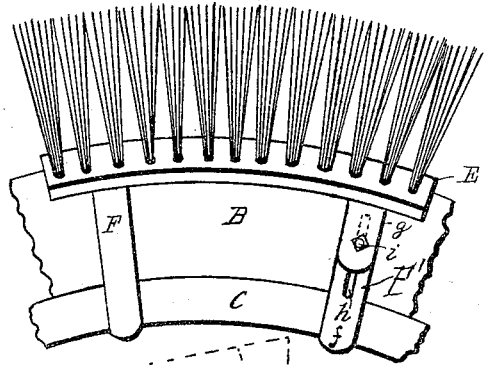
Fig. 3.
Fig. 5.
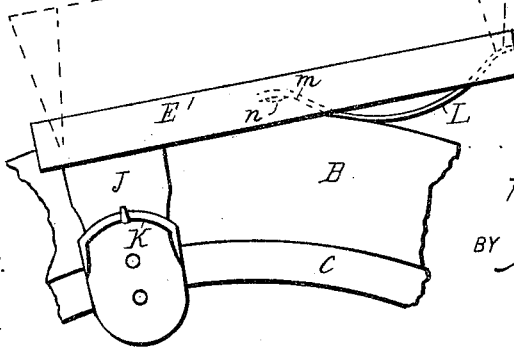
Fig. 4.
WITNESSES:
Kathleen Snell.
INVENTOR
Hiram Seymour Miller
BY Andrew Wilson.
ATTORNEY.
THE NORRIS PETERS CO., PHOTO-LITHO., WASHINGTON, D. C.

UNITED STATES PATENT OFFICE.

HIRAM SEYMOUR MILLER, OF STAMFORD, CONNECTICUT.

BICYCLE-WHEEL-GUARD CLEANER.

SPECIFICATION forming part of Letters Patent No. 611,699, dated October 4, 1898.

Application filed November 16, 1897. Serial No. 658,704. (No model.)

*To all whom it may concern:*

Be it known that I, HIRAM SEYMOUR MILLER, a citizen of the United States, residing at Stamford, Connecticut, have invented certain new and useful Improvements in Bicycle-Wheel-Guard Cleaners, of which the following is a specification.

My invention is intended to secure a simple, quick, and effective device for removing dust and dirt from the under side of the curved wheel-guards on drop-frame bicycles.

As is well understood, a curved guard, usually formed of thin wood and concavo-convex in cross-section, is placed above the drive-wheel of drop-frame bicycles and the cords are laced therefrom to the frame of the bicycle, outside of the wheel, so as to prevent the skirts of the rider from becoming entangled in the wheel. The revolution of the wheel is apt to throw any mud or loose dirt which the wheel gathers against the under side of this guard, where it accumulates and is apt to be shaken down upon the bearings of the wheel, soiling the wheel and injuring the bearings. On account of the position of the guard and the lacings attached thereto it is difficult to reach the under side of the guard and clean it in an effective manner, especially as it is customary to pass the lacing from one hole to another along the under side of the guard, thereby forming longitudinal elevations on the under side of the guard, from beside which it is difficult to remove the dust and dirt by lateral movement. My improvement is designed to reach the under side of this guard in a quick and effective manner and to clean it by sweeping or rubbing the dirt from it by a longitudinal movement.

The details of my invention are hereinafter more fully set forth.

In the drawings, Figure 1 is a side elevation of the rear portion of the bicycle with the wheel-guard attached and a portion of the wheel, showing my improved cleaner attached to the wheel. Fig. 2 is an end view of my improved cleaner, showing it attached to a section of the tire and rim. Fig. 3 is a side elevation of the same, showing a modification of the attaching-clip. Fig. 4 is a side elevation of a modification of the brush-back and its attachments, and Fig. 5 is an edge view of the modified clip shown in Fig. 3.

Similar letters of reference designate similar parts in all the figures.

A is the wheel-guard, to which are attached lacings $b\ b\ b$ in the usual manner.

B is the tire, and C the rim, of the wheel.

D is the brush, having a back E adapted to conform to the face of the tire. This back is preferably made of leather or similar material to give it an element of flexibility, but a rigid back may be used, if desired. To the back E are attached spring-clips F F, which are adapted to straddle the tire and rest with their ends grasping or near the rim of the wheel. These clips are sufficiently rigid to hold the brush firmly upon the tire when placed thereon, the ends of the clips, when bearing against the rim, preventing the brush from sliding from side to side and gripping the tire with sufficient force to hold the brush in place.

The bristles of the brush are made of sufficient length to reach the under side of the wheel-guard. When the brush is attached to the wheel, the wheel may be raised from the ground and spun, when the brush will pass beneath the wheel-guard, rubbing against the under side thereof and removing any accumulated dust or dirt. A slow or rapid motion may be given to the wheel, as desired, and the brush may be moved either forward or back under the wheel-guard. The bristles of the brush will straddle the loops of the lacing upon the under side of the guard and will effectually reach the concavity on the under side of the guard and brush away all dirt thereupon. When the cleaning is completed, the brush can be slid off of the wheel, the elasticity of the clips easily permitting this to be done.

To allow for the variation in space between the guard and wheel in different bicycles, the brush may be made with different lengths of bristles, or the whole or part of the brush may be made adjustable, so that it can be raised a greater or less distance above the wheel. In Figs. 3 and 5 I have shown a device adapted for this purpose, wherein the clip F' is made of two parts $f\ g$, the part $f$ being provided with slots $h$, in which slide bolts $i\ i$, passing through the ends of the member *g*. By loosening the bolts *i i* the parts *f g* may be drawn apart so that the portion *g*, to which the back of the brush is attached, will be elevated above the portion *f*, thereby raising that end of the brush to which this clip is attached. The parts *f g* are secured in the desired position by tightening the bolts *i i*. The said clip may be placed on each end of the brush, if desired.

In Fig. 4 I have shown another modification, wherein a strap J and buckle K are used to attach the brush-back E' to the wheel. One or more of such straps and buckles may be used instead of the clips F F, if desired. By using a strap and buckle at or near one end only of the brush, as shown in Fig. 4, and by drawing the strap taut, so that the portion of the brush to which it is attached may sink somewhat into the tire, the other end of the brush will be thrown up or elevated, so as to increase its height above the wheel, the elasticity of the tire and also of the brush, where a flexible back is used, permitting the brush to adjust itself readily to the under side of the wheel-guard. L indicates a support to rest the end of the brush upon, which support may be formed of a spring, as shown in Fig. 4. The end *m*, indicated by broken lines, may be attached by riveting the spring *n* to the back of the brush, while the other end of the spring is free.

It will be understood that the means for attaching the brush to the wheel may be varied, and I do not desire to limit myself to the specific devices shown; neither do I desire to limit myself to the use of a brush provided with bristles, as brushes or rubbers formed of other material might be used, and I use the word "cleaner" in the claims as including generally any device adapted to brush, rub, scrape, or otherwise remove dirt from the under side of the wheel-guard.

Having thus described my invention, what I claim, and desire to secure by Letters Patent of the United States, is—

1. A cycle-wheel-guard cleaner, provided with a dirt-removing portion, to engage with the under side of the wheel-guard, and with a spring-clip for attaching the same to a cycle-wheel, so that the cleaner shall be carried by the wheel under and against the wheel-guard.

2. A cycle-wheel-guard cleaner, provided with a dirt-removing portion to engage with the under side of the wheel-guard, and with an extensible clip whereby it may be attached to a cycle-wheel and adjusted at varying distances above the tire, so that the cleaner shall be carried by the wheel under and against the wheel-guard.

3. A cycle-wheel-guard cleaner, provided with a dirt-removing portion to engage with the under side of the wheel-guard, and with an extensible spring-clip whereby it may be attached to a cycle-wheel and adjusted at varying distances above the tire, so that the cleaner shall be carried by the wheel under and against the wheel-guard.

4. A cycle-wheel-guard cleaner, provided with a dirt-removing portion to engage with the under side of the wheel-guard, and with a clip having dependent metallic arms to embrace the tire of the wheel, and whereby the cleaner may be attached to a cycle-wheel, so as to be carried by the wheel under and against the wheel-guard.

5. A cycle-wheel-guard cleaner, provided with a dirt-removing portion to engage with the under side of the wheel-guard and with an extensible clip, embodying a crown portion, attached to the cleaner, and a tire-embracing portion adjustable vertically in relation to said crown portion, and whereby the cleaner may be attached to a cycle-wheel and adjusted at varying distances above the tire, so that the cleaner shall be carried by the wheel under and against the wheel-guard.

H. SEYMOUR MILLER.

Witnesses:
KATHLEEN SNELL,
WM. D. NEILLEY.